United States Patent
Kowada

(10) Patent No.: US 8,276,372 B2
(45) Date of Patent: Oct. 2, 2012

(54) EXHAUST EMISSION CONTROL DEVICE

(75) Inventor: Minoru Kowada, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 383 days.

(21) Appl. No.: 12/524,727

(22) PCT Filed: Feb. 21, 2008

(86) PCT No.: PCT/JP2008/000297
§ 371 (c)(1),
(2), (4) Date: Jul. 28, 2009

(87) PCT Pub. No.: WO2008/102561
PCT Pub. Date: Aug. 28, 2008

(65) Prior Publication Data
US 2010/0132348 A1  Jun. 3, 2010

(30) Foreign Application Priority Data
Feb. 23, 2007 (JP) .................. 2007-043493

(51) Int. Cl.
*F01N 3/035* (2006.01)
(52) U.S. Cl. ........................................ 60/295; 60/297
(58) Field of Classification Search ............... 60/296, 60/297, 301, 311, 295
See application file for complete search history.

(56) References Cited

U.S. PATENT DOCUMENTS

| | | | |
|---|---|---|---|
| 2003/0110763 A1* | 6/2003 | Pawson et al. | 60/286 |
| 2007/0012035 A1* | 1/2007 | Amemiya et al. | 60/299 |
| 2008/0264048 A1 | 10/2008 | Nishiyama et al. | |

FOREIGN PATENT DOCUMENTS

| | | |
|---|---|---|
| EP | 0 931 913 A1 | 7/1999 |
| EP | 1 643 095 A1 | 4/2006 |
| JP | 9 303140 | 11/1997 |
| JP | 2005 155404 | 6/2005 |
| JP | 2006 104944 | 4/2006 |
| WO | WO 2006/057305 A1 | 6/2006 |

OTHER PUBLICATIONS

U.S. Appl. No. 12/529,024, filed Aug. 28, 2009, Endo, et al.
U.S. Appl. No. 12/677,957, filed Mar. 12, 2010, Kowada, et al.
U.S. Appl. No. 12/679,677, filed Mar. 24, 2010, Kowada.
U.S. Appl. No. 12/738,994, filed Apr. 21, 2010, Kowada.
U.S. Appl. No. 12/742,321, filed May 11, 2010, Kowada, et al.

* cited by examiner

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

An exhaust emission control device including a casing, and a downstream exhaust passage, which extends substantially perpendicular to an axis of the casing and receives an exhaust gas flow from an outlet of the casing, is disclosed. The casing accommodates a particulate filter as a post-treatment device through which exhaust gas is passed for cleanup. In order to realize compactness in size of the whole structure without increasing exhaust resistance, an outer chamber encases the casing in a required range to provide required spacing for an open end and an outer periphery of the outlet of the casing. The outlet chamber intervenes between the outlet of the casing and the downstream exhaust passage.

18 Claims, 4 Drawing Sheets

EXHAUST EMISSION CONTROL DEVICE

TECHNICAL FIELD

The present invention relates to an exhaust emission control device.

BACKGROUND ART

It has been recently proposed that a particulate filter for capture of particulates in exhaust gas is incorporated in an exhaust pipe, selective reduction catalyst capable of selectively reacting $NO_x$ with ammonia even in the presence of oxygen being arranged downstream of the particulate filter, urea water as reducing agent being added between the selective reduction catalyst and the particulate filter, thereby attaining reduction of both the particulates and $NO_x$.

In this case, the addition of the urea water to the selective reduction catalyst is conducted between the particulate filter and the selective reduction catalyst. Thus, in order to ensure sufficient reaction time for thermal decomposition of the urea water added to the exhaust gas into ammonia and carbon dioxide gas requires, it is necessary to prolong a distance between an added position of the urea water and the selective reduction catalyst. However, such arrangement of the particulate filter and the selective reduction catalyst substantially spaced apart from each other will extremely impair the mountability on a vehicle.

In order to overcome this, the inventor invented a compact, exhaust emission control device as shown in FIGS. 1 and 2 and has already filed Japanese patent application No. 2007-29923 directed to the device. In an exhaust emission control device of the prior application, incorporated in an exhaust pipe 4 through which exhaust gas 3 flows from a diesel engine 1 via an exhaust manifold 2 is a particulate filter 5 housed in a casing 7 to capture particulates in the exhaust gas 3; arranged downstream of and in parallel with the particulate filter 5 and housed in a casing 8 is selective reduction catalyst 6 having a property capable of selectively reacting $NO_x$ with ammonia even in the presence of oxygen. A rear end of the particulate filter 5 is connected to an front end of the selective reduction catalyst 6 through an S-shaped communication passage 9 such that the exhaust gas 3 discharged through the rear end of the particulate filter 5 is passed via forward turnabout into the front end of the neighboring selective reduction catalyst 6.

As shown in FIG. 2 which shows important parts in enlarged scale, the communication passage 9 is the S-shaped structure comprising a gas gathering chamber 9A which encircles the rear end of the particulate filter 5 to gather the exhaust gas 3 through substantially perpendicular turnabout of the gas just discharged from the rear end of the particulate filter by collision of the gas against a wall surface of the gathering chamber, a mixing pipe 9B which extracts forward the exhaust gas 3 gathered by the gathering chamber 9A and which is provided with a urea water addition injector 10 (urea water addition means) midway of the mixing pipe and a gas dispersing chamber 9C which encircles the front end of the selective reduction catalyst 6 such that, through substantially perpendicular turnabout and dispersion of the gas 3 guided forward by the mixing pipe 9B by collision of the gas against a wall surface of the dispersing chamber, the dispersed exhaust gas 3 is introduced into the front end of the selective reduction catalyst 6.

Arranged in front of the particulate filter 5 in the casing 7 is oxidation catalyst 14 for oxidization treatment of unburned fuel in the exhaust gas 3, and arranged behind the selective reduction catalyst 6 in the casing 8 is ammonia reducing catalyst 15 for oxidization treatment of surplus ammonia.

With the exhaust emission control device thus constructed, the particulates in the exhaust gas 3 are captured by the particulate filter 5. Midway of the mixing pipe 9B downstream of the filter, the urea water is added to the exhaust gas 3 by the injector 10 and is thermally decomposed into ammonia and carbon dioxide gas. On the selective reduction catalyst 6, $NO_x$ in the exhaust gas 3 is satisfactorily reduced by the ammonia. As a result, both the particulates and $NO_x$ in the exhaust gas 3 are reduced.

In this case, the exhaust gas 3 from the rear end of the particulate filter 5 is introduced into the front end of the adjacent selective reduction catalyst 6 through the forward folded communication passage 9, which ensures a long distance between an added position of the urea water midway of the communication passage 9 and the selective reduction catalyst 6 and facilitates mixing of the urea water with the exhaust gas 3 due to fold-back of and thus turbulence of the exhaust gas flow, resulting in ensuring sufficient reaction time for production of ammonia from the urea water.

Moreover, the particulate filter 5 and the selective reduction catalyst 6 are arranged in parallel with each other and the communication passage 9 is arranged along and between the filter 5 and the catalyst 6, so that the whole structure becomes compact in size to substantially improve the mountability on a vehicle.

As a prior art literature pertinent to the invention, there is, for example, the following Patent Literature 1.
[Patent Literature 1] JP 2005-155404A

SUMMARY OF INVENTION

Technical Problems

However, in the above-mentioned exhaust emission control device constructed as illustrated in FIGS. 1 and 2 where the casing 7, which accommodates the particulate filter 5 as post-treatment device through which in turn the exhaust gas 3 is passed for cleanup, has an outlet connected with the gas gathering chamber 9A as downstream exhaust passage extending substantially perpendicular to the axis of the casing 7, the more compact mounting space is aimed at for accommodation of the whole structure, the more the passage at the outlet of the casing 7 is reduced to enhance the exhaust resistance, which may bring about increase in pressure loss to adversely affect engine performance.

Specifically, lessening an entire length L (see FIG. 1) of the exhaust emission control device lessens thickness t (see FIG. 1) of the gas gathering chamber 9A in the direction of the length L to thereby reduce the passage at the outlet of the casing 7, inevitably resulting in increase of exhaust resistance during passing of the exhaust gas 3 from the rear end of the particulate filter 5 through the gas gathering chamber 9A.

The invention was made in view of the above and has its object to realize compactness in size of the whole structure without increase of exhaust resistance in an exhaust emission control device wherein a casing accommodating a post-treatment device such as particulate filter has an outlet connected with a downstream exhaust passage extending in an direction different from an axis of the casing.

Solution to Problems

The invention is directed to an exhaust emission control device wherein a casing accommodating a post-treatment device through which in turn exhaust gas is passed for cleanup is incorporated in an exhaust passage, the casing having an outlet connected with a downstream exhaust passage extending in a direction different from an axis of said casing, characterized in that an outlet chamber encases the outlet of the casing in a required range to provide required spacing to an open end and outer periphery of the outlet of the casing, said outlet chamber intervening between the outlet of the casing and the downstream exhaust passage.

Thus, in this case, the outlet of the casing is connected with the downstream exhaust passage via the intervening outlet chamber encasing the outlet of the casing in the required range, which brings about a new passage also expanded between the outer periphery of the outlet of the casing and the outlet chamber. As a result, without especially great spacing ensured between the open end of the outlet of the casing and the outlet chamber, sufficient cross section of the passage is ensured for smooth flowing of the exhaust gas having been passed through the post-treatment device.

If the open end of the outlet of the casing were directly connected with the downstream exhaust passage using for example flanges, the exhaust passage had to be connected and turned about within the limited mounting space, resulting in necessity of using the exhaust passage with reduced cross section. However, the invention connects the outlet of the casing with the downstream exhaust passage through the intervening outlet chamber, so that the downstream exhaust passage with greater cross section can be constructed with no restriction on a position relationship to the open end of the outlet of the casing.

A post-treatment device in general through which exhaust gas is passed for cleanup has an active temperature zone for exhibition of sufficient exhaust cleanup performance and therefore tends to be lowered in performance when operation condition with lower exhaust temperature continues for a long time due to for example traffic jam. However, where the outlet of the casing is encased by the outlet chamber in the required range for communication of the exhaust gas, the required range is heat-isolated and -reserved not to be liable to be robbed of heat by ambient air, so that an operation region in which the post-treatment device in the casing can exhibit sufficient exhaust cleanup performance is expanded to lower-temperature side.

Further, it is preferable in the invention that the outlet chamber are divided into segments in a position upstream of the open end of the outlet of the casting, the segments being detachably connected together via flanges. Then, while the downstream exhaust passage is constructed in greater cross section on a side nearer to the open end than the connected position by the flanges, the adoption of the detachable segmented structure using the flanges makes it possible to easily conduct maintenance of the post-treatment device.

For example, where the post-treatment device is a particulate filter, ash derived from lubrication oil and produced during combustion in cylinders is accumulated inside. Thus, maintenance is required such as direct air or aqueous cleaning of the particulate filter or replacement with a new particulate filter. The segmentation of the outlet chamber facilitates such maintenance work for the particulate filter.

Advantageous Effects of Invention

An exhaust emission control device of the invention mentioned in the above can attain a variety of excellent effects and advantages as follows.

(I) According to the invention, without expansion of the mounting space for the exhaust emission control device, the passage at the outlet of the casing is expanded to ensure sufficient cross section enough for smooth flowing of the exhaust gas having been passed through the post-treatment device; moreover, the downstream exhaust passage can be constructed with grater cross section with no restriction on a position relationship to the open end of the outlet of the casing. As a result, the whole structure can be made compact in size without causing increase in exhaust resistance; adverse affect on the engine performance due to increase in pressure loss can be prevented from occurring.

(II) According to the invention, the outlet chamber encases the outlet of the casing in the required range for communication of the exhaust gas, so that the required range of the outlet of the casing is heat-isolated and -reserved not to be liable to be robbed of heat by ambient air. As a result, the operation region where the post-treatment device in the casing can exhibit sufficient exhaust cleanup performance can be expanded to lower-temperature side.

(III) According to the invention, while the downstream exhaust passage is constructed in greater cross section on a side nearer to the open end than the connected position by the flanges, the adoption of the detachable segmented structure using the flanges facilitates maintenance work for the post-treatment device. It is especially convenient where the post-treatment device is particulate filter. Because, ash derived from lubrication oil and produced during combustion in cylinders is accumulated inside and air or aqueous cleaning of the particulate filter or replacement into new particulate filter is carried out.

REFERENCE SIGNS LIST

Figure 1:
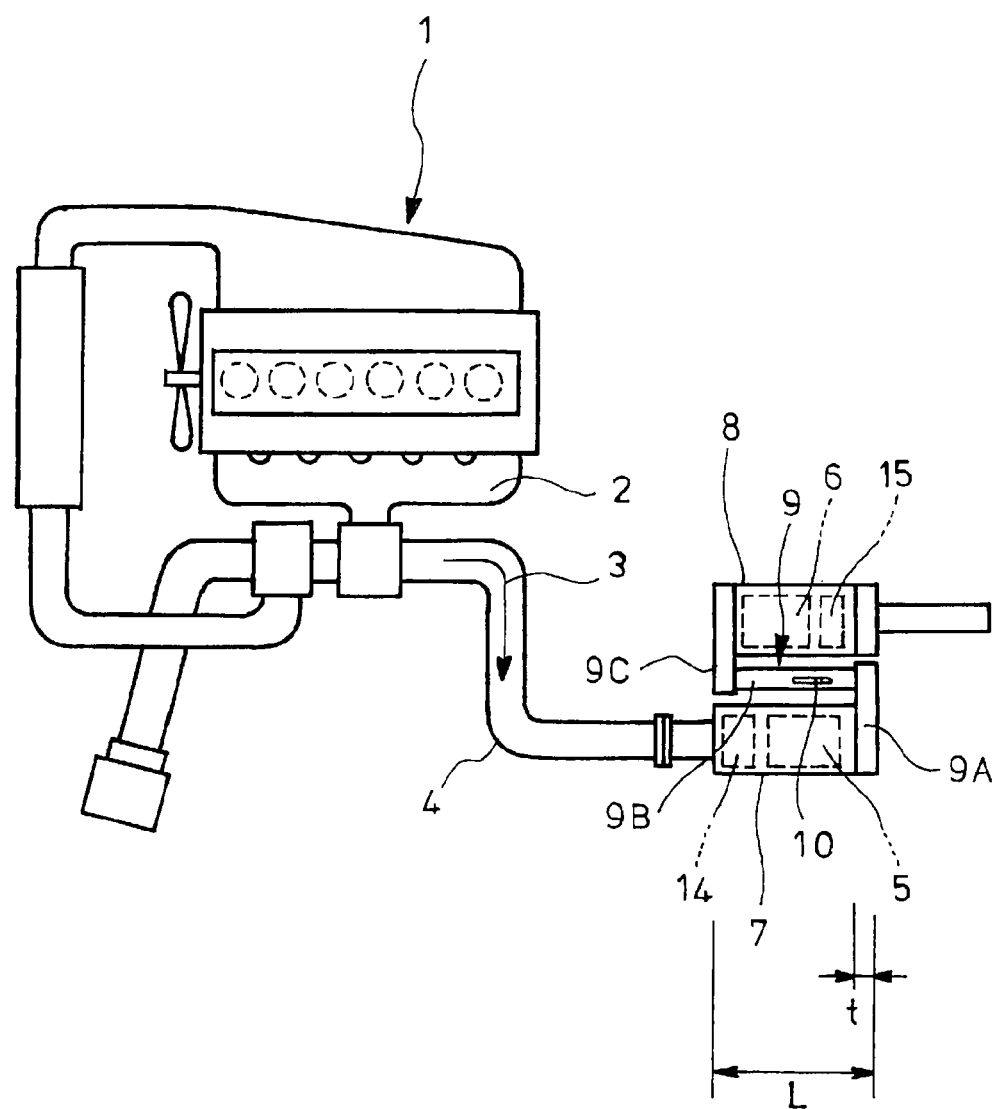
FIG. 1 is a schematic view showing a conventional device.

3 exhaust gas
4 exhaust pipe
5 particulate filter (post-treatment device)
7 casing
7*a* open end
7*b* outer periphery
11 outlet chamber
12 downstream exhaust passage
13 flange

DESCRIPTION OF EMBODIMENT

An embodiment of the invention will be described in conjunction with the drawings.

Figure 2:
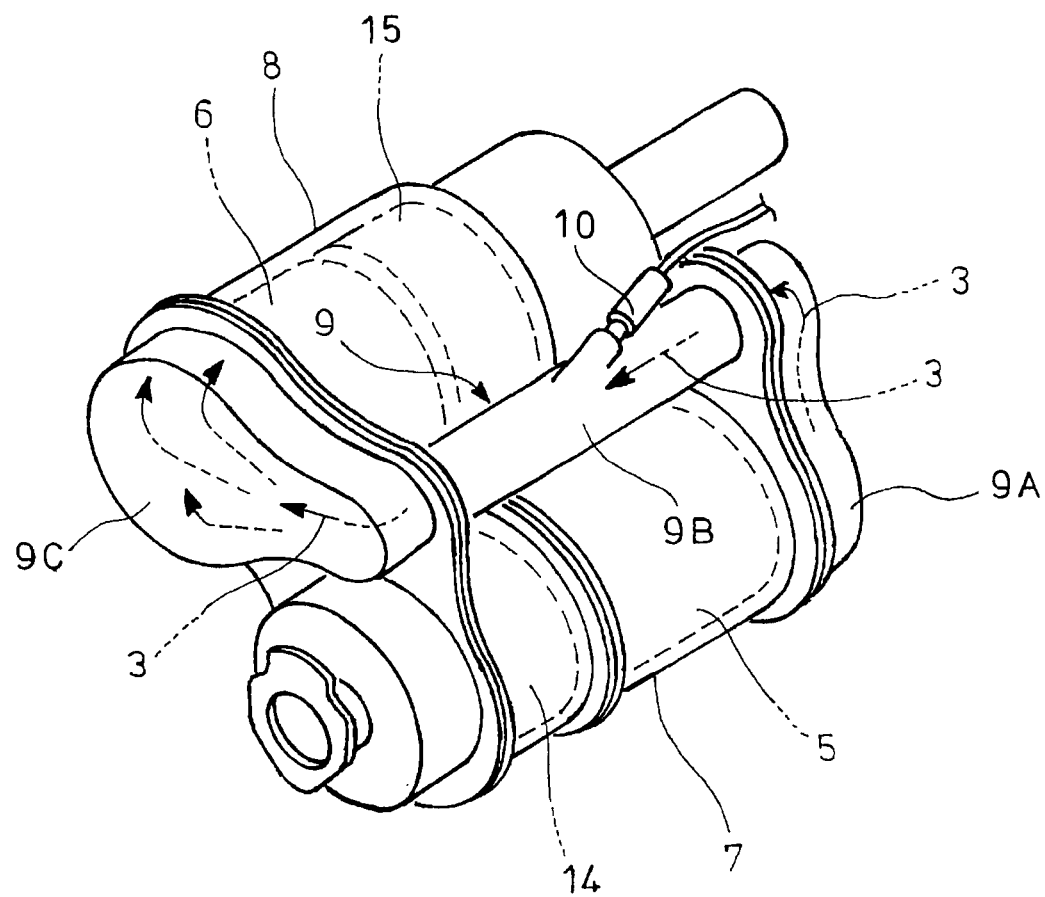
FIG. 2 is a perspective view showing important parts in FIG. 1 in enlarged scale.
Figure 3:
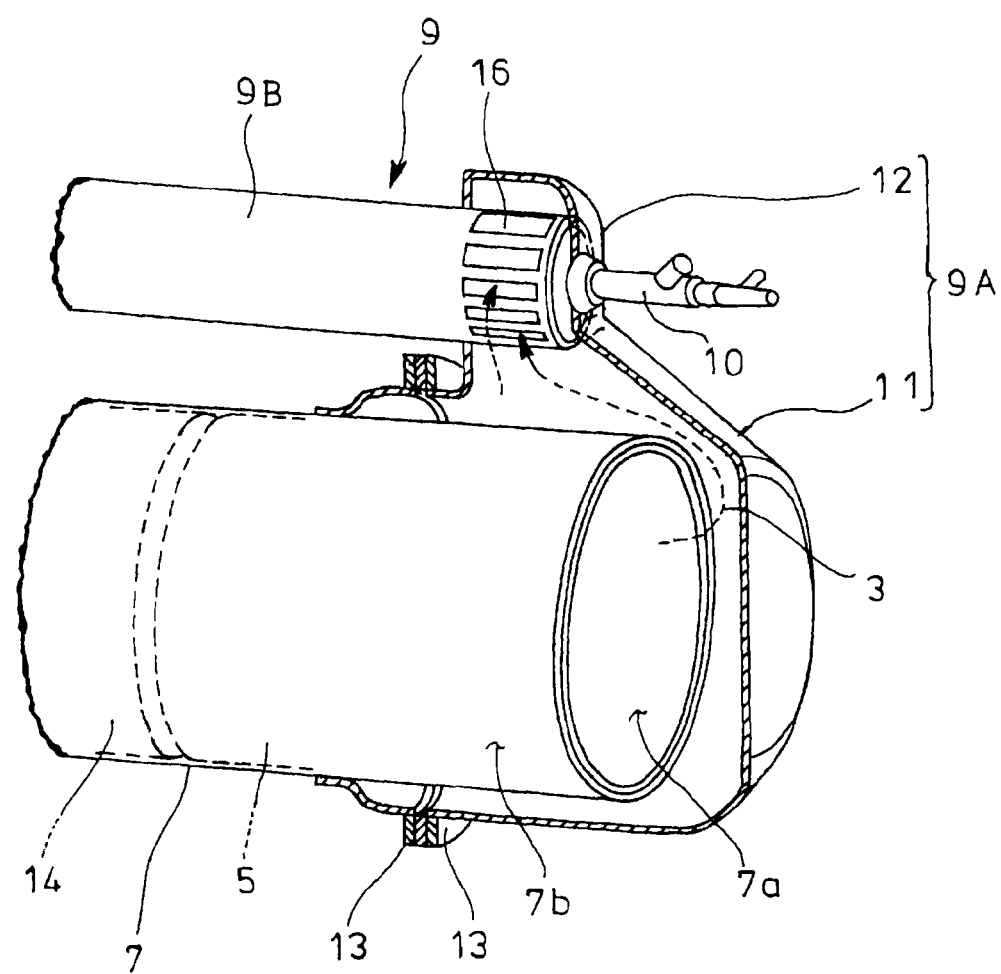
FIG. 3 is a partly cut-out perspective view showing an embodiment of the invention.
Figure 4:
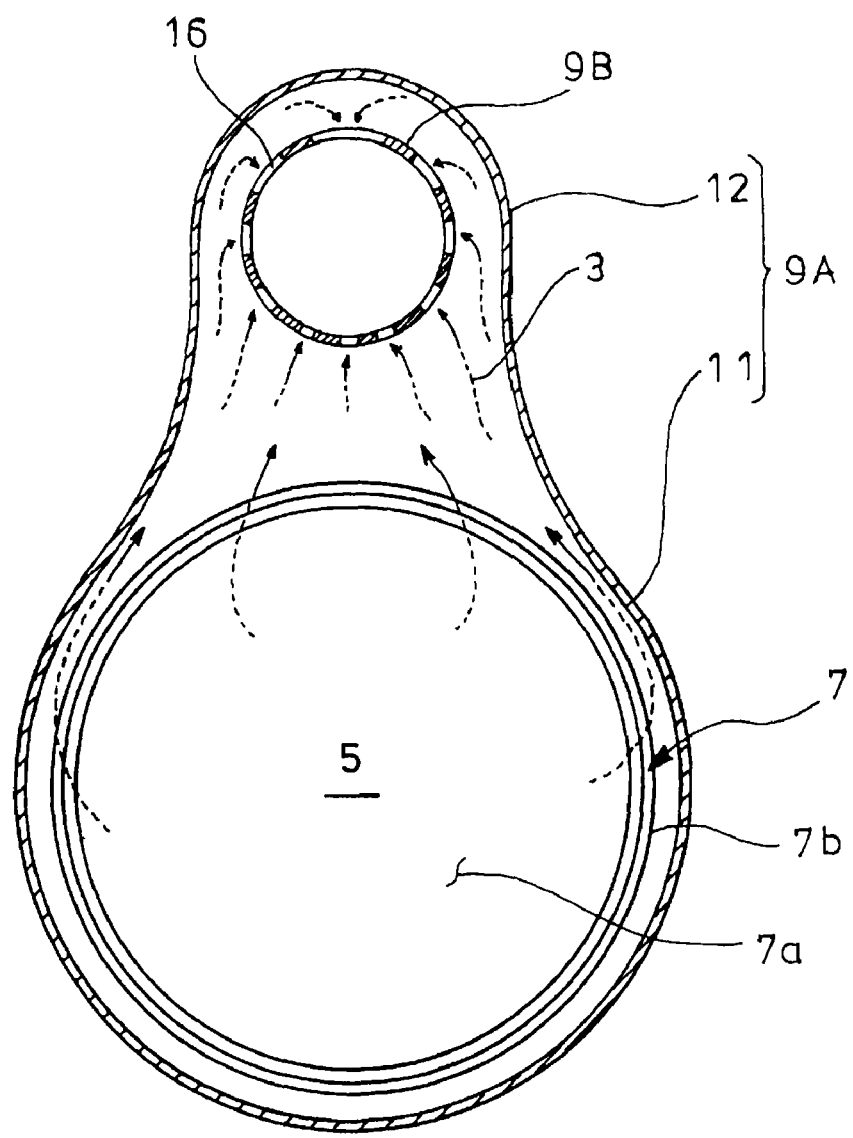
FIG. 4 is a sectional view showing important parts in FIG. 3 in enlarged scale.

FIGS. 3 and 4 show an embodiment of the invention. The embodiment is directed to an exhaust emission control device constructed substantially similar to that mentioned in the above with respect to FIGS. 1 and 2 wherein a casing 7 accommodating particulate filter 5 (post-treatment device) has an outlet connected with a gas gathering chamber 9A which has an upstream end in the form of an outlet chamber 11 as described later and a downstream end extending therefrom substantially perpendicular to the axis of the casing 7 and being in the form of a downstream exhaust passage 12 connected to the outlet of the casing 7 through the outlet chamber 11.

Specifically, the outlet chamber 11 encases the outlet of the casing 7 in a required range to provide required spacing to an open end 7a and an outer periphery 7b of the outlet of the casing 7. The outlet chamber 11 is divided into segments in a position upstream of the open end 7a of the outlet of the casing 7 and the segments are detachably connected together through flanges 13, the exhaust passage 12 being integrally arranged in a position nearer to the open end 7a than the connected position by the flanges 13.

In the embodiment illustrated, a rear end of the mixing pipe 9B is formed with a plurality of slits 16 (openings) in circumferentially spaced positions for introduction of the exhaust gas 3. The downstream exhaust passage 12 is connected to the rear end of the mixing pipe 9B such that the exhaust passage encases the respective slits 16 and closes the rear end of the mixing pipe 9B.

The respective slits 16 on the rear end of the mixing pipe 9B are adjusted such that opening areas of the same are gradually increased from upstream to downstream sides of the exhaust gas 3 flowing circumferentially around the pipe; thus, introduction of the exhaust gas 3 into the mixing pipe 9B which is liable to be biased to upstream-side slits 16 due to relatively high pressure and high flow rate is leveled off.

Then, to the rear end of the mixing pipe 9B closed by the downstream exhaust passage 12, a urea water addition injector 10 as urea water addition means is coaxially fitted for addition of the urea water centrally of the rear end of the mixing pipe 9B.

Thus, in this manner, the outlet of the casing 7 is connected with the downstream exhaust passage 12 through the intervening outlet chamber 11 which encases the outlet of the casing 7 in the required range, so that a new flow passage of the exhaust gas 3 is also expanded between the outlet of the casing 7 and the outlet chamber 11. As a result, without especially ensuring larger spacing of the outer chamber 11 to the open end 7a of the outlet of the casing 7, sufficient cross section of the passage is ensured for smooth flowing of the exhaust gas 3 having been passed through the particulate filter 5.

If the open end 7a of the outlet of the casing 7 were directly connected with the downstream exhaust passage using for example flanges, the exhaust passage had to be connected and turned about within the limited mounting space, resulting in necessity of using the exhaust passage with reduced cross section. However, the invention connects the outlet of the casing with the downstream exhaust passage 12 through the outlet chamber 11, so that the downstream exhaust passage 12 with greater cross section can be constructed with no restriction on a position relationship to the open end 7a of the outlet of the casing 7.

Thus, according to the above embodiment, without expansion of the mounting space for the exhaust emission control device, the passage of the outlet of the casing 7 can be expanded to ensure sufficient cross section of passage enough for smooth flowing of the exhaust gas 3 having been passed through the particulate filter 5; moreover, the downstream exhaust passage 12 can be constructed with greater cross section and with no restriction to the position relationship to the outlet open end 7a of the casing 7, the whole structure can be compacted in sized without causing increase of exhaust resistance and prevented is adverse affect on engine performance due to increase of pressure loss.

In the particulate filter 5 arranged in the casing 7, the captured particulates will spontaneously burn off for disposal in an operation condition with high exhaust temperature, so that where operation condition with low exhaust temperature continues for a long time due to for example traffic jam, there is a fear that regeneration of the particulate filter does not proceed well. However, as mentioned in the above, where the outlet chamber 11 encases the outlet of the casing 7 in the required range for communication of the exhaust gas 3, the required range of the outlet of the casing 7 can be heat-isolated and -reserved not to be liable to be robbed of heat by ambient air, so that the operation region where regeneration of the particulate filter 5 in the casing 7 proceeds well can be expanded to lower-temperature side.

In the embodiment, the post-treatment device is illustrated as being particulate filter 5. Alternatively, the post-treatment device may be a kind of catalyst such as selective reduction catalyst, $NO_x$ storage-reduction catalyst or oxidation catalyst. Anyway, there is activate temperature region for exhibition of sufficient exhaust cleanup performance, so that the fact that the outlet of the casing 7 is heat-insulated and -reserved is greatly meritorious and an operation region in which such catalyst can exhibit sufficient exhaust cleanup performance can be expanded to lower-temperature side.

Further, in the embodiment, the outlet chamber 11 is divided into segments in a position upstream of the outlet open end 7a of the casing 7, the segments being detachably connectable together using flanges 13. Thus, while the downstream exhaust passage 12 is constructed with greater cross section in a position nearer to the open end 7a than the connected position by the flanges 13, the adoption of the detachable segmented structure using the flanges 13 facilitates maintenance work for the particulate filter 5.

Specifically, where the post-treatment device is the particulate filter 5, ash derived from lubrication oil and produced in combustion in cylinders is accumulated inside, so that maintenance is required which is direct air or aqueous cleaning of the particulate filter 5 or replacement into new particulate filter 5. If the outlet chamber 11 is segmented, such maintenance work for the particulate filter 5 can be easily conducted.

It is to be understood that an exhaust emission control device according to the invention is not limited to the above embodiment and that various changes and modifications may be made without leaving the gist of the invention. The post-treatment device may be one other than particulate filter; for example, catalyst such as selective reduction catalyst, $NO_x$ storage-reduction catalyst or oxidation catalyst may be employed as post-treatment device. The exhaust emission control device is not limited to the embodiment illustrated which comprises two kinds of post-treatment devices juxtaposed and interconnected through a S-shaped communication passage.

The invention claimed is:

1. An exhaust emission control device, comprising:
    a casing incorporated in an exhaust passage;
    a first post-treatment device, through which exhaust gas flows for cleanup, disposed within the casing, the casing having an outlet connected with a downstream exhaust passage extending in a direction different from an axis of said casing; and
    an outlet chamber encasing the outlet of the casing in a range to provide spacing to an open end and outer periphery of the outlet of the casing, said outlet chamber intervening between the outlet of the casing and the downstream exhaust passage, wherein
    a flow cross section of the outlet chamber gradually decreases from the casing outlet to the downstream exhaust passage, whereby the outlet chamber is constructed as an upstream end of a gas gathering chamber for gathering exhaust gas from an outlet of the first post-treatment device, at least a portion of a flow cross section of the outlet chamber is defined by a first annular gap between an outer diameter of the casing and an inner diameter of the outlet chamber, the outer diameter of the casing defines an inner diameter of the first annular gap, and the inner diameter of the outlet chamber defines an outer diameter of the first annular gap.

2. The exhaust emission control device as claimed in claim 1, wherein the outlet chamber is divided into segments in a position upstream of an open end of the outlet of the casing, said segments being detachably connected together through flanges.

3. The exhaust emission control device as claimed in claim 1, further comprising:

a communication passage incorporated in the exhaust passage downstream of the casing outlet, wherein at least a portion of a flow cross section of the downstream passage is defined by a second annular gap between an outer diameter of the communication passage and an inner diameter of the downstream passage, the outer diameter of the communication passage defines an inner diameter of the second annular gap, and the inner diameter of the downstream passage defines an outer diameter of the second annular gap.

4. The exhaust emission control device as claimed in claim 1, wherein an exhaust inlet of the exhaust emission control device, whereby an exhaust flow enters the exhaust emission control device, is substantially coaxial with an axis of the casing.

5. The exhaust emission control device as claimed in claim 1, further comprising:

a second post-treatment device incorporated in the exhaust passage downstream of the first post-treatment device, wherein an axis of the second post-treatment device is substantially parallel to an axis of the first post-treatment device and spaced apart from the axis of the first post-treatment device by a first distance.

6. The exhaust emission control device of claim 5, further comprising:

an S-shaped communication passage disposed in the exhaust passage, connecting an outlet of the first post-treatment device to an inlet of the second post-treatment device.

7. The exhaust emission control device as claimed in claim 5, wherein an exhaust outlet of the exhaust emission control device, whereby an exhaust flow exits the exhaust emission control device, is substantially coaxial with an axis of the second post-treatment device.

8. The exhaust emission control device of claim 5, wherein the second post-treatment device is a reducing catalyst.

9. The exhaust emission control device of claim 5, wherein the first post-treatment device is a particulate filter.

10. An exhaust emission control device, comprising:

a casing disposed in an exhaust passage, the casing having an inlet and an outlet, wherein the inlet is opposite the outlet;

a first post-treatment device disposed within the casing; and a communication passage disposed in the exhaust passage downstream of the casing, wherein:

an axis of the communication passage is substantially parallel to an axis of the casing and spaced apart from the axis of the casing by a first distance, the communication passage extends from a first end to a second end, the communication passage includes at least one aperture through a periphery of the communication passage between the first end and the second end, whereby an exhaust flow enters the communication passage, an axial extent of the at least one aperture along the axis of the communication passage lies between a first plane through the first post-treatment device inlet and a second plane through the first post-treatment device outlet, and the first plane and the second plane are substantially perpendicular to an axis of the first post-treatment device.

11. The exhaust emission control device of claim 10, further comprising:

a second post-treatment device disposed in the exhaust passage downstream of the communication passage, wherein an axis of the second post-treatment device is substantially parallel to the axis of the casing and spaced apart from the axis of the casing by a second distance.

12. The exhaust emission control device of claim 11, wherein an exhaust outlet of the exhaust emission control device, whereby an exhaust flow exits the exhaust emission control device, is substantially coaxial with the axis of the second post-treatment device.

13. The exhaust emission control device of claim 10, wherein the first post-treatment device is a particulate filter.

14. The exhaust emission control device of claim 10, wherein the second post-treatment device is a reducing catalyst.

15. The exhaust emission control device of claim 10, further comprising:

an oxidation catalyst disposed in the exhaust passage upstream of the first post-treatment device.

16. The exhaust emission control device of claim 10, wherein the at least one aperture through the periphery of the communication passage consists of a plurality of apertures, the plurality of apertures distributed along a circumference of the communication passage.

17. The exhaust emission control device of claim 10, wherein an exhaust inlet of the exhaust emission control device, whereby an exhaust flow enters the exhaust emission control device, is substantially coaxial with the axis of the casing.

18. The exhaust emission control device of claim 10, further comprising:

a fluid injector disposed inside the communication passage.

* * * * *